April 22, 1924.
M. E. LAYNE
1,491,149
THRUST BEARING
Filed May 8, 1922
4 Sheets-Sheet 1
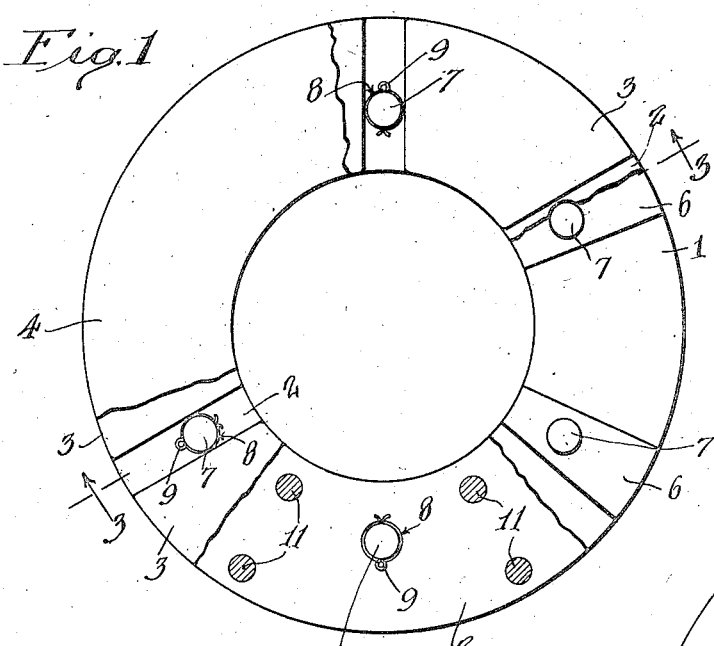
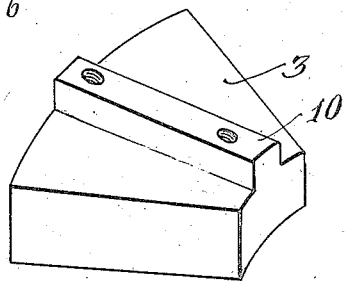
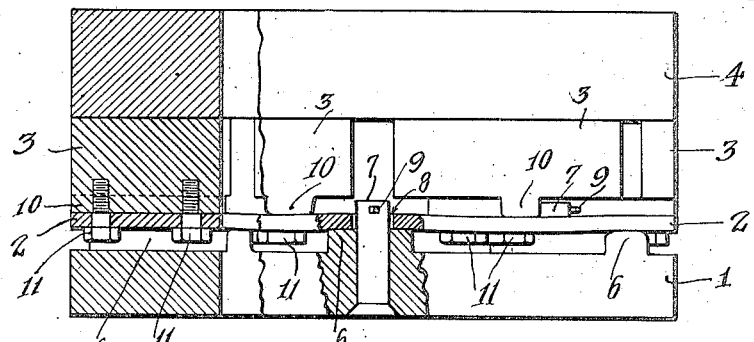
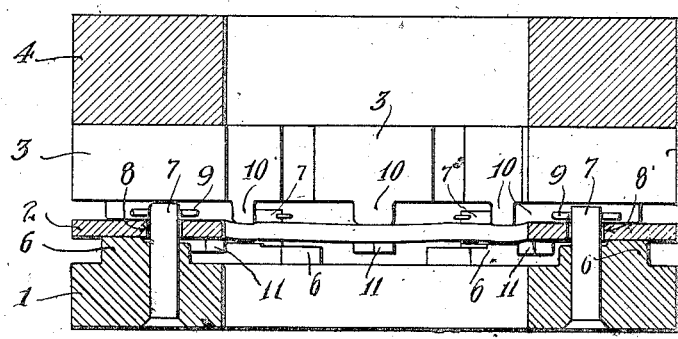
Inventor
Mahlon E. Layne
By Lyon & Lyon
Attys.

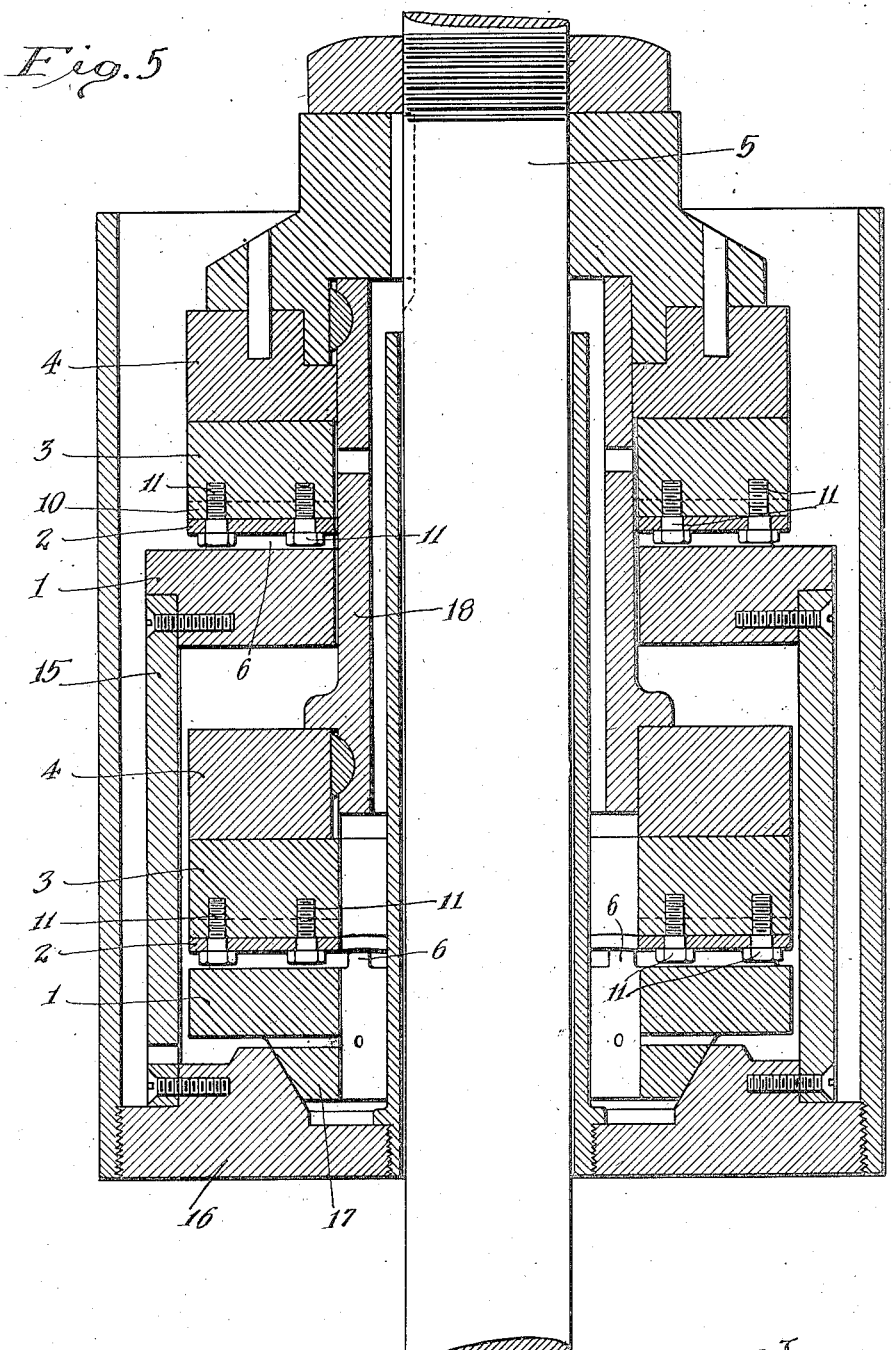

April 22, 1924.
M. E. LAYNE
THRUST BEARING
Filed May 8, 1922
4 Sheets-Sheet 3
1,491,149
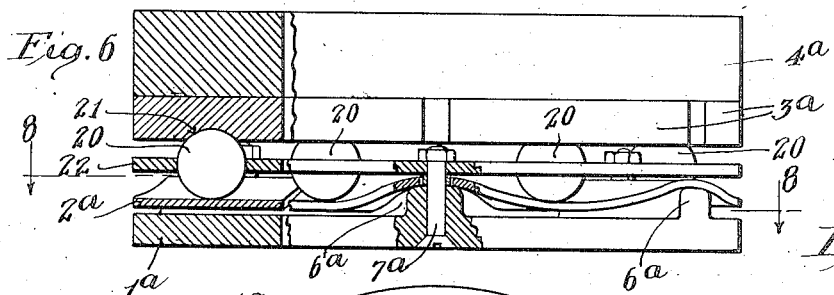
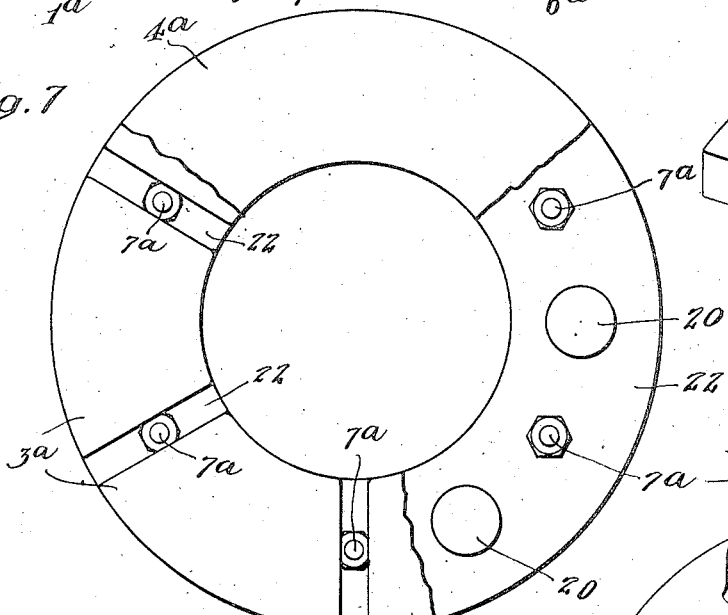
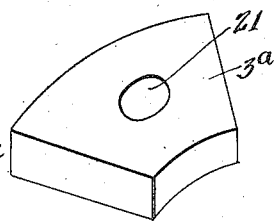
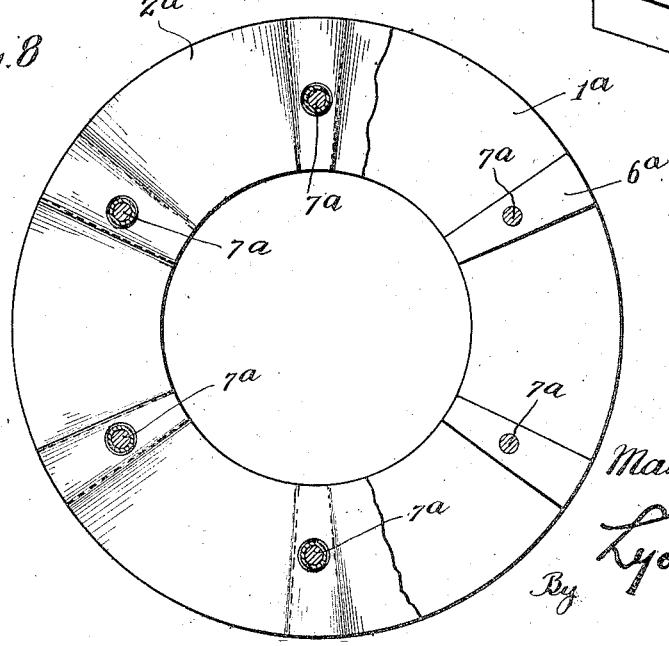
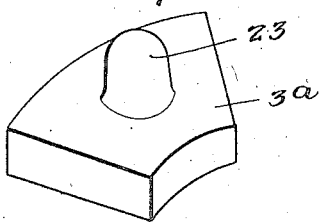
Inventor
Mahlon E. Layne.
By Lyon & Lyon
attys.

April 22, 1924.
M. E. LAYNE
THRUST BEARING
Filed May 8, 1922     4 Sheets-Sheet 4
1,491,149
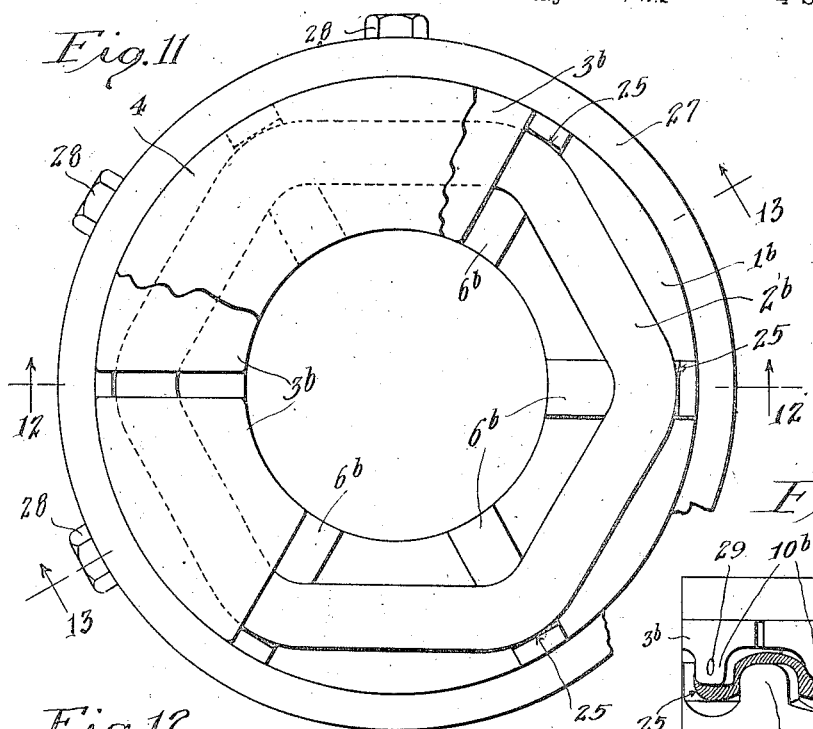
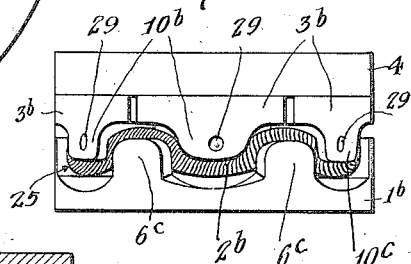
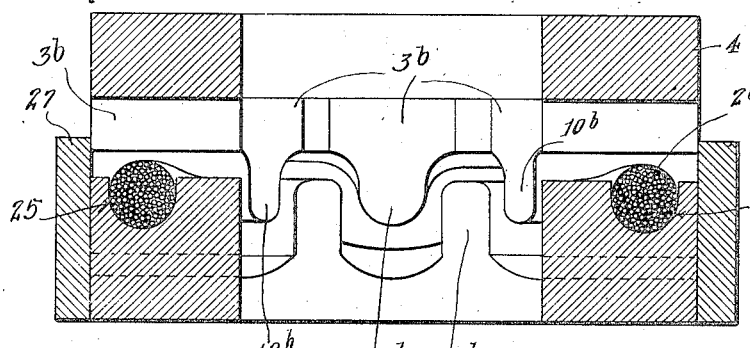
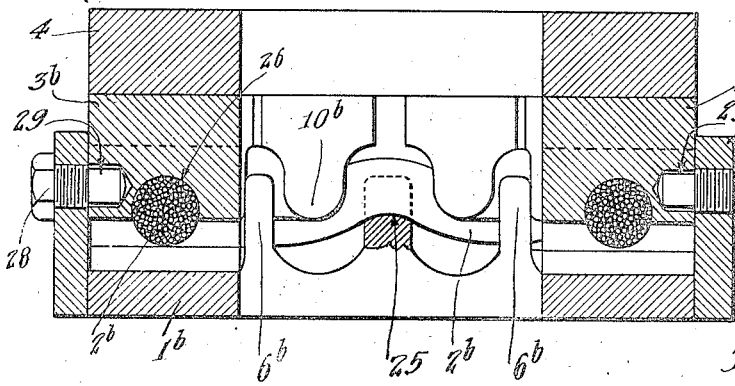
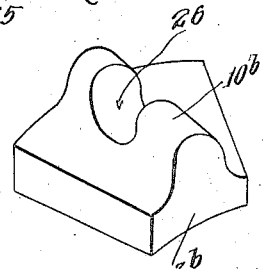
Inventor
Mahlon E. Layne
By Lyon & Lyon
attys Patented Apr. 22, 1924.

1,491,149

UNITED STATES PATENT OFFICE.

MAHLON E. LAYNE, OF HOUSTON, TEXAS.

THRUST BEARING.

Application filed May 8, 1922. Serial No. 559,319.

*To all whom it may concern:*

Be it known that I, MAHLON E. LAYNE, a citizen of the United States, residing at Houston, in the county of Harris and State of Texas, have invented a new and useful Thrust Bearing, of which the following is a specification.

This invention relates to thrust bearings and is particularly directed to heavy duty bearings adapted to sustain relatively heavy loads rotating at relatively high speeds.

An object of the invention is to provide a bearing of the above character including provisions whereby the load pressures are automatically equalized over the entire bearing surface area so as to eliminate the creation at any point of a unit pressure sufficient to destroy the oil film maintained between the bearing surfaces.

Another object is to provide a bearing in which one of the bearing members comprises a plurality of bearing units associated with a flexible supporting element functioning in a hammock like manner upon a depression of any one unit to elevate the other units to automatically bring the bearing surfaces of all the units to one plane.

Another object is to provide a bearing, the effective operation of which does not depend upon accurate machining or adjusting of the parts, and which is durable, positive in operation, and is economical and simple in construction.

Various other objects will be more fully apparent from the following description of the accompanying drawings which form a part of this disclosure, and which illustrate the invention in its preferred forms of embodiment.

Of the drawings:

Fig. 1 is a plan view partly broken away to more clearly illustrate certain details of construction.

Fig. 2 is an elevation partly broken and in section.

Fig. 3 is a section on line 3—3, of Fig. 1, excepting that in this section is shown a slightly modified form of base member.

Fig. 4 is a perspective view of one of the bearing shoes, looking at its under side.

Fig. 5 is a vertical section through a compound bearing including two of the bearing units illustrated in Figs. 1 to 4.

Fig. 6 is an elevation partly broken and in section, showing a modified form of structure.

Fig. 7 is a plan view, similar to Fig. 1, of the bearing shown in Fig. 6.

Fig. 8 is a plan section on line 8—8, of Fig. 6.

Fig. 9 is a perspective view of one of the bearing shoes shown in Figs. 6 and 7, looking at its under side.

Fig. 10 is a similar perspective view of a bearing shoe of slightly modified form.

Fig. 11 is a plan view, similar to Figs. 1 and 7, showing another modified form of structure.

Fig. 12 is a section on line 12—12 of Fig. 11.

Fig. 13 is a section on line 13—13 of Fig. 11.

Fig. 14 is a perspective view of one of the bearing shoes shown in Figs. 11 to 13, looking at its under side.

Fig. 15 is an elevation of the type of bearing shown in Figs. 11 to 13, showing a slightly modified form of bearing shoe.

On bearings of the general character herein referred to it is of great importance to maintain a proper film of lubricant between the bearing surfaces and to prevent the creation at any one point of a unit pressure sufficient to break down or destroy said oil film. In general practice such unit pressure may result from improper alinement of the bearing surfaces due to inaccurate machining or installation of the various parts, from warping or wearing of such surfaces and supports, derangement of the bearing foundation, and the like. Proper alinement of the bearing surfaces is usually initially obtained by extremely accurate machining and by manual adjustments at great cost, but this alinement is obviously only temporary, due to wear and developments incident to use.

Taking the above into consideration, I have produced a bearing in which one of the bearing surfaces is of an automatic compensating nature such as will absorb an abnormal unit pressure exerted at any one point and cause it to be distributed equally throughout the entire bearing surface so as to prevent bearing failures by reason of a squeezing out of the oil film between the individually overloaded surfaces.

In the usual well known forms of bearing of this general type the base member of the bearing is carried upon a suitable support and enclosed in an oil tight casing in which the oil level is maintained above the bearing surfaces, but such arrangement is now so well known that those parts having no direct bearing upon the present invention have been eliminated from the drawings to avoid confusion.

With reference to the drawings, attention is directed to the general arrangement of the major elements constituting the bearing, such elements comprising a stationary base member 1, a flexible bridge member 2 supported thereon, a bearing member consisting of a plurality of bearing shoes 3 resting upon the bridge member, and a rotatable bearing member 4 engaging the bearing surfaces of the shoes. In general practice the member 4 is keyed or otherwise connected to rotate with the shaft 5 (see Fig. 5).

With particular reference to Figs. 1 to 4, and describing in detail the form of bearing illustrated therein, the stationary base member or ring 1 is provided with a plurality of circularly spaced supporting abutments in the form of upstanding radial ribs 6, and resting upon said abutments is the flexible bridge plate 2, said plate being retained against rotation by studs 7 carried by the base 1 and projecting upwardly above the surface of each abutment, and extending through orifices 8 in the plate. Said orifices are slightly larger in diameter than the studs 7 to allow for a flexation of the plate, in the manner which will later be explained, and the plate is prevented from becoming disengaged from the studs by split pins 9 extending through transverse holes in the studs above the plate.

Each of the bearing shoes 3 is provided with radially disposed downwardly projecting ribs 10 which rest upon the flexible bridge plate 2 between adjacent abutments 6 of the base and each shoe is secured in position to said plate by bolts 11 extending upwardly through the plate and screw-threaded into the shoe.

In this manner the several shoes are maintained in definite relation to the plate and to the abutments and are prevented from rotating. The several shoes 3 provide a non-rotative bearing member supporting the rotative bearing member 4, with each shoe capable of vertical movement in an automatic compensating adjustment to relieve an abnormal distribution of load pressures.

Such compensating adjustment is effected through the medium of the flexible bridge plate and in the following manner.

Assuming that one of the bearing shoes 3 is subjected to an abnormal unit pressure, such shoe will be depressed and will cause a downward flexation of that portion of the bridge plate 2 with which it engages between two adjacent abutments 6, and as the plate is of fixed diameter and incapable of being stretched, the downward flexation of one portion between two of the abutments will cause a compensating upward flexation of the other portions of the bridge plate to reestablish an even distribution of the load pressure througout the entire bearing surface area.

In a bearing of this construction all inaccuracies of machining of the various parts are immediately compensated for and the load is so distributed as to always maintain an adequate oil film between the bearing surfaces.

In Fig. 5 of the drawings I have illustrated a compound or two stage bearing in which each unit is of the same general construction as that described above. In this arrangement the base member of the upper unit is carried by a sleeve 15 supported upon a bottom plate 16 and the base member of the lower unit has a self centering tapered projection 17 engaging in a correspondingly tapered seat in the bottom plate 16.

The rotatable bearing members 4 of both units are joined by a sleeve 18 so as to rotate together with the shaft 5, such connection distributing the load to both bearing units.

In the form of structure illustrated in Figs. 6 to 9, the base 1$^a$ has the abutment ribs 6$^a$ and the studs 7$^a$ extend through apertures in the flexible bridge plate 2$^a$ in the same manner as in the previously described structure. The rotatable bearing member 4$^a$ is supported upon the bearing surfaces of the radial bearing shoes 3$^a$, but in the present instance instead of resting directly upon the bridge plate, the shoes each rest upon a ball 20 engaging a concave seat 21 in the lower surface of the shoe. The several balls are retained in their proper spaced relation by a spacing plate 22 which is provided with apertures through which the balls project and which is secured against rotation by connection with the several studs 7$^a$.

If desired, instead of the arrangement just described, the balls may be replaced by rounded projections 23 formed integral with the shoes 3$^a$.

In Figs. 11 to 14 of the drawings I have illustrated a form of bearing in which a flexible cable has been used in place of a flexible plate as in the previously described structures. In such arrangement the base member 1$^b$ has the abutment ribs 6$^b$ each of which is formed with a rounded recess 25 in its upper surface. In the recesses of the several abutments is positioned an endless flexible cable 2$^b$, preferably of steel, and incapable of being materially longitudinally stretched. Each of the bearing shoes 3$^b$ has a downwardly projecting medial rib 10$^b$ provided with a rounded recess 26 adapted to embrace the cable between adjacent abutments. To prevent rotation of the several bearing shoes, the base 1ᵇ has an annular side wall 27 carrying a series of studs 28, the inner end of each stud projecting into an aperture 29 in the adjacent bearing shoe 3ᵇ, such apertures being elongated vertically to permit a free vertical movement of the shoes.

In Fig. 15 the abutments 6ᶜ and ribs 10ᶜ are circularly extended to give a greater length of supporting surface for the cable 2ᵇ and to provide for a more extended engagement of the several shoes with the cable.

A bearing constructed according to the principle of the above described structures provides for an automatic equalizing of the load pressures to preserve the oil film between the bearing surfaces and eliminates to a maximum degree all requirements for close machine work.

While the structures shown and described are well adapted to fulfill all the objects primarily stated, it is to be understood that it is not intended to confine the invention to the embodiment disclosed herein, for it is susceptible of embodiment in various other forms, all coming within the broad scope of the claims which follow.

I claim:

1. A thrust bearing comprising a rotatable bearing member, a stationary member having relatively spaced supporting abutments, a bridge member resting upon said abutments, and a plurality of bearing shoes each supported upon the bridge member between adjacent abutments and engaging the rotatable bearing member, said bridge member being longer than the spaces between the supporting abutments and suspending the bearing shoes in hammock like manner.

2. A thrust bearing comprising a stationary member having relatively spaced supporting abutments, a bridge member resting upon said abutments and extending downwardly between adjacent abutments in a hammock like manner, and bearing shoes supported on the bridge member between adjacent abutments.

3. A thrust bearing comprising a rotatable bearing member, a stationary member having relatively spaced supporting abutments, a bridge member resting upon said abutments, said bridge member being longer than the spaces between the supporting abutments and extending downwardly between adjacent abutments in a hammock-like manner, balls supported on the bridge member between adjacent abutments, and bearing shoes supported on the balls.

4. A thrust bearing comprising a rotatable bearing member, a stationary bearing member having relatively spaced supporting abutments, a bridge member resting upon said abutments, said bridge member extending downwardly between adjacent abutments in a hammock-like manner, balls supported on the bridge member between adjacent abutments, and bearing shoes supported on the balls and having concave recesses engaging the balls.

MAHLON E. LAYNE.

Witnesses:
 FRANK ANDREWS,
 W. R. GORDON.